Patented June 9, 1936

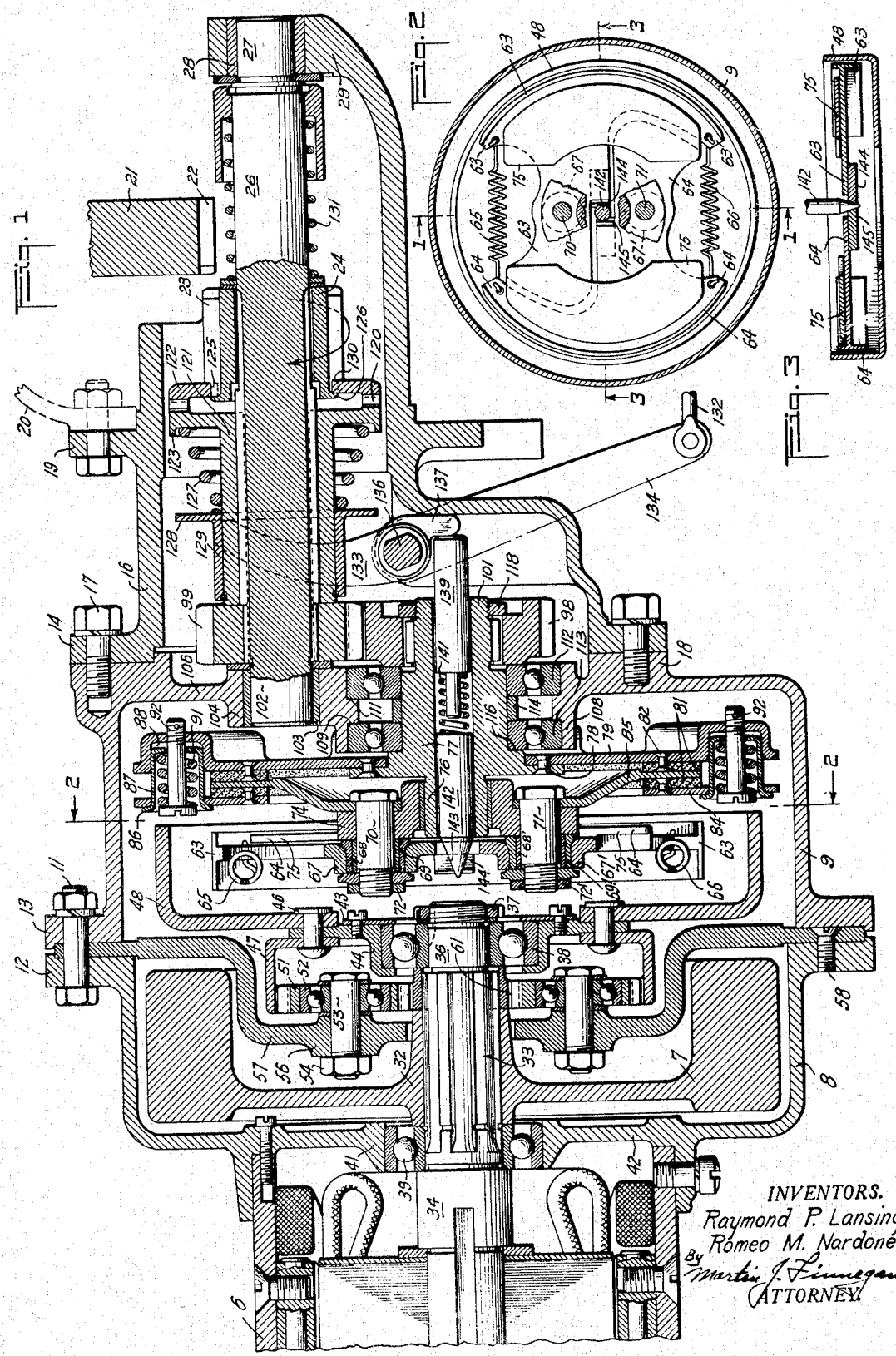

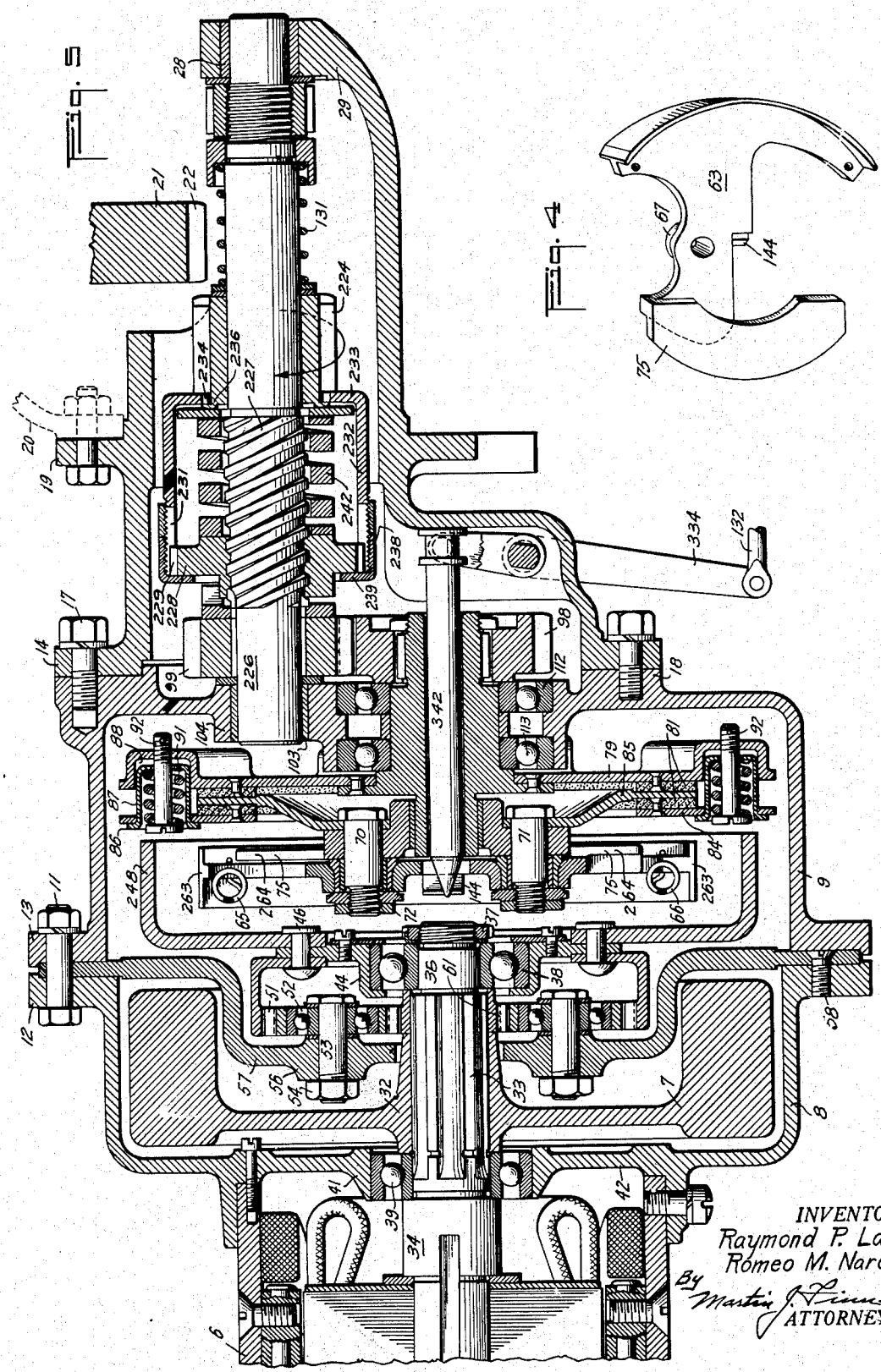

2,043,623

UNITED STATES PATENT OFFICE 2,043,623

ENGINE STARTING APPARATUS

Raymond P. Lansing, Montclair, and Romeo M. Nardone, East Orange, N. J., assignors, by mesne assignments, to Eclipse Aviation Corporation, East Orange, N. J., a corporation of New Jersey Application June 20, 1932, Serial No. 618,396

11 Claims. (Cl. 123—179)

This invention relates to engine starting apparatus and more patricularly to a starter of the inertia type.

An object of the invention is to provide an engine starter of the type wherein a small flywheel is rendered capable of exerting a comparatively great inertia effect through being energized to a high speed of rotation and then drivably connected with an engine to be started, through a torque multiplying gear train and a torque limiting clutch mechanism. Such torque limiting clutch mechanism is subject to relatively high loads requiring substantial wearing surface and high friction producing pressure, which is usually applied by relatively heavy spring means serving to maintain the clutch engaged at a preset pressure. Extreme free running in the disconnected or energizing period is essential, but it is difficult to achieve where the clutch is preset in the manner just described, unless there is a normally open break in the transmission train, between the flywheel and the preset clutch.

Accordingly, an object of the invention is to provide such a normally open break in the form of friction elements movable radially into operative position, in combination with a second friction clutch of the preset character above described. A feature of the invention in this connection is the provision of means constantly tending to release said manually engaged friction clutch, and insuring disengagement thereof as soon as the engaging pressure is released.

Another object of the invention is to provide a relatively small and compact inertia starter applicable to a wide variety of engines including the types commonly encountered in the motor vehicle art, in most of which the space available for installation of an engine-engaging member is limited. Most automobile starters, whether for passenger vehicles or trucks, include a pinion adapted to mesh with a large gear, integral with or mounted on the engine flywheel, and when engagement of such a pinion is attempted at a relatively high speed, serious clashing may result.

Accordingly, another object of the present invention is to provide means whereby the starter mechanism may be brought up to full speed while the pinion or other engine-engaging member is stationary, and the pinion then engaged at zero, or at creeping velocities with the engine, such engagement being concurrent with the establishment of a driving connection between the accelerated flywheel and said pinion.

A further object of the invention is to provide a clutch operating mechanism embodying a resilient lost-motion connection, insuring a gradual engagement of the clutch and thus preventing a too sudden application of load, as well as causing a gradual initial rotation of the pinion, thus facilitating proper registry between the teeth of the pinion and those of the engine member engaged by the pinion.

Another object of the invention is to provide a one-way clutch mechanism in combination with the friction clutch mechanism above referred to, for the purpose of drivably connecting said friction clutch mechanisms with the engine-engaging pinion, during the cranking operation, and permitting the pinion to overrun when the engine starts.

These and other objects of the invention will become apparent from inspection of the following specification when read with reference to the accompanying drawings, wherein are illustrated two embodiments of the invention. It is to be expressly understood, however, that the drawings are for the purpose of illustration only, and are not designed as a definition of the limits of the invention, reference being had to the appended claims for this purpose.

In the drawings,—

Fig. 1 is a longitudinal sectional view of a device embodying the invention, the section being taken on line 1—1 of Fig. 2;

Fig. 2 is a transverse sectional view taken substantially on the line 2—2 of Fig. 1, but on a reduced scale;

Fig. 3 is a sectional view taken along the line 3—3 of Fig. 2;

Fig. 4 is an isometric view of one of the clutch elements; and

Fig. 5 is a longitudinal section of another embodiment of the invention.

Referring to the drawings, the embodiment therein shown consists of a four-part casing, the first part of which encloses power operated means, herein shown in the form of an electric motor 6 for energizing the inertia element of a starter, the latter being shown at 7 in the second section 8 of the casing. Section 9 is shown as coaxial with and of substantially the same diameter as section 8 and is connected thereto by suitable bolts 11 provided at corresponding intervals along the circumferential flanges 12 and 13, of the casing sections 8 and 9 respectively. A similar circumferential flange 14 is provided on the inner casing section 16, and serves for the reception of screws 17 by which the section 16 is attached to a strengthened portion 18 of the section 9. A second circumferential flange 19 serves as the locating and mounting means by which the starter may be attached to the frame or crankcase 20 of the engine to be started, one of the rotatable members of which is indicated at 21 as having teeth 22 adapted to be engaged by corresponding teeth 23 on the engine engaging member 24 of the starter, the latter being slidably and rotatably received on a shaft 26, the outer end 27 of which is rotatably supported in a friction reducing sleeve bearing 28 located in the apertured supporting end 29 of the casing section 16.

As shown, the inertia element 7 has a hub 32 drivably connected as by splines 33 with the armature shaft 34 of the energizing motor, the said armature shaft having a reduced outer end 36 threaded to receive a retaining nut 37 for the bearing member 38 which rotatably supports certain parts to be presently described. The bearing 39 in which the shaft 33 is supported, is received in a suitable hub 41 in the transversely extending portion 42 of the casing section 8, while the outer race of the bearing member 38 is held in place by the retaining washer 43 secured to the retaining cup 44 which is in turn riveted or otherwise suitably secured, as indicated at 46, to a pair of cup-shaped elements or drums 47 and 48, and thus forms a driving connection therebetween.

The gearing forming the driving connection between the flywheel 7 and the first drum 47 is preferably composed of a plurality of planet pinions 51, each mounted in a ball bearing 52, surrounding a corresponding number of mounting shafts, herein shown in the form of bolts 53 held in place by nuts 54 engaging the outer surfaces of the apertured bosses 56 of a transversely disposed recess wall 57, the latter being held in place between the flanges 12 and 13 on the casing sections 8 and 9 respectively, by suitable means, as indicated at 58. As shown, the planet pinions 51 mesh with a sun gear or pinion 61 splined to the armature shaft 34 to rotate with the flywheel 7, and also mesh with an orbit gear preferably constituted by the formation of teeth on the inner circumferential surface of the drum 47.

From the foregoing it is apparent that the flywheel 7 may be accelerated to a high speed, and the members 47 and 48 to a proportionately lower speed, through energization of the motor 6 and the driving connections above described. There remains to be described the novel means for transferring the energy thus stored in the flywheel 7 to the engine member 21.

In both embodiments shown, the energy transfer is effected through a plurality of radially movable elements 63—64, having convex frictional surfaces described about a common center coinciding with the axis of rotation of the drum 48, said elements 63—64 being engageable with said drum upon outward radial movement in opposition to the action of the tension springs 65—66 connecting their ends, as indicated best in Fig. 2 and thus tending constantly to hold said friction elements in the disengaged position in which function they are assisted by the counter-weights 75 secured to the clutch elements in such positions (as indicated best in Fig. 4) that centrifugal force acts upon them in a direction imparting to them a leverage action which is opposite to that of the elements 63—64, and thus prevents a premature engagement of the clutch. As shown, the elements 63—64 have their lateral surfaces apertured and turned to form hubs 67—67' (Fig. 1) receiving friction reducing sleeves 68—68' and 69—69' through which extend bolts 70—71 respectively, on which the friction shoes 63—64 are adapted to rock in response to actuation of the manual control means to be described; the bolts or mounting studs 70—71 being threaded to receive the retaining means 72—72' for the shoes 63—64. The studs 70—71 also pass through openings appropriately provided in a plate or spider 74 rotatable on the reduced end 76 of a centrally disposed shaft 77 supporting said spider and drivably connected by the means indicated at 78, to the outer retaining and abutment plate 79 of the preset friction clutch mechanism, now to be described.

The second clutch mechanism includes a plurality of (herein shown as two) annular friction discs 81, one of which is riveted or otherwise suitably secured, as indicated at 82, to the abutment plate 79, and the second of which is similarly secured to an annular plate 84. The discs 81 are held in assembled relation, and frictionally engage a driving plate 85 mounted on the spider 74, the assemby being effected by virtue of the engagement of the outer plate 84 with the outwardly flared circumferential edges 86 of thimbles 87 slidably mounted in correspondingly shaped recesses 88 in the retaining plate 79. Each thimble houses a compression spring 91, the pressure of which is adjustable by means of the screws 92, to place any desired preset pressure on the discs 81, and thus fix the torque transmitting capacity of the clutch.

The means for drivably connecting the shaft 77 with the engine engaging pinion 24 includes suitable pinions 98 and 99, the former being drivably connected to the splined outer end 101 of the shaft 77, and the latter being similarly connected to the shaft 26 adjacent its inner end 102 which is rotatably received in a friction reducing sleeve bearing 103 mounted in boss 104 of the transversely disposed wall 106 of the casing section 9. A second and centrally disposed boss 108 is formed in the wall 106 and is shouldered as indicated at 109 and 111 for receiving and retaining in proper axial relation, the bearing members 112 and 113 in which the shaft 77 is rotatably received. A sleeve 114 and a shoulder 116 and pinion 98 also assist in properly locating these parts and the assembly is then secured in place by the attachment of the retaining nut 118, threaded to the end 101 of the shaft 77.

The one-way driving connection between the shaft 26 and pinion 24 preferably takes the form of a pair of interengaging elements 121 and 122, the former constituting a sleeve splined to the shaft 26, and having a flange 123, on one face of which are provided ratchet teeth 120 adapted to co-act with corresponding ratchet teeth on the opposing face of the element 122, the latter being secured to the pinion 24 by virtue of the notched or toothed formation indicated at 125, which permits registry with the corresponding teeth of pinion 24 to which the member 122 is held against shoulders 130 on teeth 23, by peening over the edge of the pinion as indicated at 126. A coiled compression spring 127 having one end abutting the flange 128 of a sleeve 129 free on the sleeve 121 (after engagement of pinion 24 with member 21) acts to yieldably maintain the ratchet teeth of the sleeve 121 in engagement with those of the element 122, while at the same time permitting sleeve 121 to withdraw sufficiently to allow the pinion 24 to overrun the shaft 26 after the engine commences to fire, and thus acquires a higher speed of rotation than that of the shaft 26. A second compression spring 131 yieldably opposes the advance of the pinion 24 and prevents the drift of the latter into contact with the teeth 22, when the starter is inoperative.

The novel control means for effecting the engagement of the one-way clutch mechanism 122—123 and by the same action, the friction clutch mechanism 63—64 with 48 preferably comprises a yoke 133 embracing the sleeve 129 and adapted to press against the flange 128 in response to a thrust exerted by suitable means 132 on the outer end of a lever 134 mounted on a rock shaft 136 to which the said yoke 133 is drivably connected by suitable means, as by milling flat surfaces on the shaft, as indicated, and broaching a corresponding bore through the arched portion of the yoke. A finger 137 has an apertured head which is also connected to the rock shaft 136 in a like manner, and is provided to translate the oscillation of the lever 134 into an axial motion of a plunger 139, a compressible spring 141, and a clutch actuating pin 142. The latter is preferably of conical formation at its inner end as indicated at 143, and engages correspondingly beveled surfaces on the plates 144—145 (Fig. 3) secured to the lateral surfaces of the clutch elements 63—64, respectively.

Having thus described the parts entering into the preferred embodiment of the invention, as shown, it will be seen that the operation is as follows:

The motor 6 is first energized to accelerate the flywheel and drum 48 to the proper speed, whereupon the lever 134 is actuated in a clockwise direction, to mesh pinion 24 with the engine gear 21 and then, through the action of the finger 137 and plungers 139 and 142, cause the friction shoes 63—64 to contact with the inner surface of the drum 48. Driving connection is thus established between the flywheel and the engine, and a multiplied torque is transmitted to the latter member through the clutch parts 48, 63—64, 85—81, and 122—123. In the event of failure of the teeth of pinion 24 to effect immediate entry into the spaces between the corresponding teeth of the engine member 21, the completion of the clutch engaging action can be effected nevertheless, since the spring 127 can yield sufficiently to permit the lever 134 to complete its swing. As the spring 141 acts to cause clutch elements 63—64 to grip the drum surface gradually, the resulting gradual acceleration of the elements connected therewith causes the pinion to be rotated sufficiently to relieve the abutting condition, whereupon the energy stored in the spring 127 becomes effective to snap the pinion into full mesh with the gear 21. As the friction elements 63 and 64 are accelerated to the speed of the driving drum 48, their self-energizing qualities, derived from their shape, mounting and relative disposition, cause them to register snugly with the inner surface of the drum 48, thus increasing their torque transmitting capacity to a value far in excess of the point at which the discs 81 will slip on the plate 84 in the event of a suddenly acquired excessive load, as backfire, for example.

When the engine starts under its own power, even though the operator is somewhat tardy in releasing the lever 134, there is nevertheless no drive transmitted back to the starter, for the ratchet teeth on member 122 may overrun the teeth 120 of the sleeve 121, thus permitting the pinion to overrun the shaft 26. As soon as the lever 134 is released, the spring 131 is effective to demesh the pinion 24, while springs 65—66, 127 and 141 are effective to return the other parts to the normal positions indicated in Fig. 1.

Fig. 5 shows a somewhat modified construction wherein the lever 334 acts only upon a plunger 342 to engage the friction elements 263—264 with the drum 248, the advance of the pinion 224 into mesh with the engine member 21 being effected automatically in response to the driving connection thus established. As shown in Fig. 5, in place of the shaft 26 of the preferred embodiment, there is substituted a shaft 226 having a coarsely threaded portion 227 intermediate its ends, adapted to carry a correspondingly threaded nut 228 having peripheral notches or splines 229 corresponding in number and width to fingers 231 formed by removing portions of one end of a cylindrical drum or barrel 232, the opposite end of which is turned inwardly as indicated at 233, and cut so that the teeth 234 are adapted to register with the teeth of the pinion 224 with which they engage, and to which they are held by peening over the end of the pinion as indicated at 236. As shown, the drum or barrel 232 is threaded at the slotted end to receive a correspondingly threaded sleeve 238 which is inwardly turned to engage the rear lateral surface of the nut 229 as indicated at 239, thus insuring, in conjunction with the construction shown at 233 and 234, above described, movement of the members 229, 238, 232 and 224 as a unit, in either direction, except for the possibility of a limited amount of relative motion between the members 229 and 232, such relative motion being yieldingly opposed by the compression spring 242.

The pinion assembly of Fig. 5 just described, is similar in construction and method of operation to that described in the Richards Patent No. 1,310,091, patented July 15, 1919, and is claimed herein only to the extent that it constitutes part of a novel combination in its coaction with the particular driving mechanism shown in Fig. 1, and duplicated in Fig. 5.

There is thus disclosed a novel engine starting mechanism of the inertia type, which, due to its relatively small size and compactness is inexpensive to manufacture and operate; and is readily applicable to installations where the size of the casing surrounding the engine engaging member is limited.

While the construction herein illustrated is known to be of considerable practical merit, it is contemplated that changes may be made in the construction and relative arrangement of the parts. Thus, for example, the planetary gearing may be changed or eliminated, and other flywheel energizing means substituted for the motor herein suggested. Likewise, other changes may be made in the form, details of construction, arrangement of parts and the uses to which they are applied, without departing from the spirit of the invention or the scope of the appended claims.

What is claimed is:

1. In an engine starting mechanism of the type employing a member movable into engagement with a member of the engine to be started, the combination with said engine member and engine-engaging member of manually operable means for effecting engagement of said members, said driving means for said members including a driving member and a friction clutch normally disengaged from but movable to engage said driving drum to be driven thereby, said clutch being engageable by the motion imparted thereto through actuation of said manually operable means, and ratchet means connecting said clutch with said engine engaging member, said ratchet means being releasable only when the engine member overruns the engine engaging member.

2. In an engine starting mechanism of the type employing a driving shaft rotatably supporting an engine engaging member, the combination with said engine engaging member of a ratchet driving connection between said shaft and engine engaging member, manually operable means for controlling said driving connection, and driving means for said shaft including a prime mover and a normally disengaged clutch, said clutch being engageable by the motion imparted thereto through actuation of said manually operable means.

3. Engine starting mechanism comprising a driven member adapted to engage and crank an engine member, an inertia member, means for rotating said inertia member to store energy therein, said driven member being disengaged from both said engine member and said inertia member during the period of storage of energy in the latter, means including a gear train, and a clutch operable to drivably connect said inertia and driven members when engaged, a rod movable axially through a member of said gear train to engage said clutch, and means for concurrently producing axial movement of said rod and driven member.

4. Engine starting mechanism comprising an engine member and a driven member adapted to engage and crank said engine member, an inertia member, means for rotating said inertia member to store energy therein, means including a gear train and a clutch operable to drivably connect said inertia member and said driven member when engaged, a rod movable axially through a member of said gear train to engage said clutch, a shaft disposed transversely of said rod and driven member, means for oscillating said shaft, and means mounted on said shaft for translating the oscillatory movement thereof into an axial movement of both said rod and driven member.

5. Engine starting mechanism comprising an engine member and a driven member adapted to engage and crank said engine member, an inertia member, means for rotating said inertia member to store energy therein, said driven member being disengaged from both said engine member and said inertia member during the period of storage of energy in the latter, a clutch operable to drivably connect said inertia member and driven member when engaged, means movable along an axis parallel to the axis of rotation of said driven member to engage said clutch, and means adapted to swing in the plane of said axes to produce concurrent movement of said axially movable means and driven member.

6. Engine starting mechanism comprising an engine member and a driven member adapted to engage and crank said engine member, an inertia member, means for rotating said inertia member to store energy therein, said driven member being disengaged from both said engine member and said inertia member during the period of storage of energy in the latter, means including a pair of drivably connected shafts disposed in parallelism, and a clutch operable to drivably connect said inertia member and driven member when engaged, means slideable along one of said shafts to engage said clutch, means slidable along the other of said shafts to engage said driven member with said engine member, and common control means for both said engaging means.

7. Engine starting mechanism comprising an engine member and a driven member adapted to engage and crank said engine member, an inertia member, means for rotating said inertia member to store energy therein, means including a pair of drivably connected shafts disposed in parallelism and a clutch operable to drivably connect said inertia member and driven member when engaged, means for engaging said driven member with said engine member, means movable along an axis parallel to the axis of rotation of said driven member to engage said clutch, and common control means for said last named means and driven member.

8. In apparatus of the class described an engine member, an electric motor having a shaft, a flywheel adapted to be driven by said shaft, means including a self-energizing clutch for transmitting torque from said flywheel to said engine member, a second clutch interposed between said engine member and said first-named clutch for absorbing shocks and overloads, and means slidably mounted within said second clutch for moving said first named clutch into engaging position.

9. In apparatus of the class described an engine member, an electric motor, a shaft adapted to be driven by said motor, a flywheel mounted on said shaft for rotary movement therewith, means including a plurality of friction clutches for transmitting power from said flywheel to said engine member, one of said clutches being normally disengaged, means slidably mounted within the other of said clutches for rendering said normally disengaged clutch operative, and engine engaging means connected to the first-named clutch.

10. In apparatus of the class described an engine member, an electric motor, a shaft adapted to be driven by said motor, a flywheel mounted on said shaft for rotary movement therewith, reduction gearing drivably connected to said shaft, means including a driven shaft adapted to be drivably connected to said engine member, a clutch interposed between said reduction gearing and said driven shaft, and means laterally offset from said driven shaft for engaging said clutch.

11. In apparatus of the class described, an electric motor having an extending shaft, a flywheel carried by the shaft, reduction gearing coaxial with said shaft and adapted to be driven thereby, a clutch coaxial with said reduction gearing and operatively associated therewith, a driven shaft operatively connected to said clutch, means on said driven shaft for drivably connecting the same with said engine member, resilient means for disengaging said clutch, a rod laterally offset from said driven shaft for engaging said clutch and manually operable means for actuating said rod.

RAYMOND P. LANSING.
ROMEO M. NARDONE.